United States Patent [19]

Nash

[11] 4,148,771

[45] Apr. 10, 1979

[54] METHOD OF MAKING NOVEL RUBBERY BLOCK COPOLYMERS AND PRESSURE-SENSITIVE ADHESIVES

[75] Inventor: Larry L. Nash, Borger, Tex.

[73] Assignee: Phillips Petroleum Company, Bartlesville, Okla.

[21] Appl. No.: 809,491

[22] Filed: Jun. 23, 1977

[51] Int. Cl.$^2$ ............................................. C08L 25/10
[52] U.S. Cl. ............................ 260/27 BB; 260/880 B
[58] Field of Search ....................... 260/880 B, 27 BB

[56] References Cited

U.S. PATENT DOCUMENTS

| | | | |
|---|---|---|---|
| 3,281,383 | 10/1966 | Zelinski | 260/880 B |
| 3,637,554 | 1/1972 | Childers | 260/880 B |
| 3,639,517 | 2/1972 | Kitchen | 260/880 B |
| 3,658,740 | 4/1972 | Marrs | 260/27 R |
| 3,753,936 | 8/1973 | Marrs | 260/27 R |
| 3,950,291 | 4/1976 | Jurrens | 260/23.7 R |
| 3,993,613 | 11/1976 | Doss | 260/27 R |

FOREIGN PATENT DOCUMENTS 997889 9/1976 Canada.

*Primary Examiner*—Paul R. Michl

[57] ABSTRACT

Rubbery coupled conjugated diene/monovinyl-substituted aromatic hydrocarbon teleblock copolymers are prepared by incremental addition of both monovinyl-substituted aromatic hydrocarbon and initiator. The resulting copolymers can be used to produce improved pressure-sensitive adhesives.

18 Claims, No Drawings

METHOD OF MAKING NOVEL RUBBERY BLOCK COPOLYMERS AND PRESSURE-SENSITIVE ADHESIVES

BRIEF SUMMARY OF THE INVENTION

This invention relates in one aspect to a new method of making conjugated diene/monovinyl-substituted aromatic hydrocarbon teleblock copolymers (either linear or radial). In another aspect it relates to the new copolymers which result. In still another aspect, this invention relates to improved pressure-sensitive adhesives.

BACKGROUND OF THE INVENTION

How to improve the specific adhesive property of holding power (or creep resistance), while maintaining other desirable adhesive properties such as good quick stick and 180° peel strength, is an important problem in the art of adhesives. Marrs, U.S. Pat. No. 3,658,740 disclosed this problem. His solution was to combine a branched block copolymer with a linear block copolymer or with a block copolymer. A simpler solution than blending of copolymers was sought in the present invention.

STATEMENT OF THE INVENTION

It has now been discovered that the technique of charging both a monovinyl-substituted aromatic hydrocarbon and an initiator in at least two increments prior to the addition of a conjugated diene will result in a rubbery copolymer which exhibits a very special property: i.e., when the copolymer is used to produce pressure-sensitive adhesives, the adhesives exhibit greatly improved holding power as compared with adhesives prepared from copolymers not prepared by this inventive method. The inventive adhesives also exhibit very good quick stick and good 180° peel strength. In this invention, the term "rubbery" means that the described material retracts within one minute to less than 1.5 times its original length after having been stretched at room temperature (18° to 29° C.) to twice its length and held for one minute before being released.

It is an object of this invention to provide a method for producing these novel copolymers. Another object is to provide block copolymers useful in adhesive formulations. It is also an object of this invention to provide a pressure-sensitive adhesive having improved holding power, very good quick stick and good 180° peel strength.

DESCRIPTION OF THE PREFERRED EMBODIMENTS

The novel rubbery teleblock copolymers of this invention are represented by the general formula

(S—D)$_x$Y wherein S represents a block of polymerized monovinyl-substituted aromatic hydrocarbon molecules, D represents a block of polymerized conjugated diene molecules, Y represents the residue of a polyfunctional coupling agent, x is an integer of at least 2 and can be (ideally) equal to the number of reactive sites on the polyfunctional coupling agent, and wherein the heterogeneity index (a measure of molecular weight distribution) of the monovinyl-substituted aromatic hydrocarbon portion of the novel copolymer is greatly increased by the inventive method as compared with the corresponding prior art copolymer, whereas the heterogeneity index of the total novel copolymer is not appreciably correspondingly increased.

It should be noted that the novel copolymers can be either linear or radial although the radial (or branched) copolymers are preferred because of their superior properties in adhesives. The preparation of branched copolymers from monolithium-terminated polymers by coupling with agents having at least three reactive sites is broadly disclosed in Zelinski, et al, U.S. Pat. No. 3,281,383; and that patent is hereby incorporated by reference.

The preparation of linear teleblock copolymers by sequential monomer polymerization or coupling with bifunctional agents as such is also well known in the art.

The conjugated dienes useful with the monovinyl-substituted aromatic hydrocarbon in preparation of the novel teleblock copolymers are those having 4 to 8 carbon atoms. Examples of these C$_4$–C$_8$ conjugated dienes are: 1,3-butadiene, isoprene, 2,3-dimethyl-1,3-butadiene, piperylene, 2,4-hexadiene, 1,3-octadiene, and the like. Especially preferred are butadiene and isoprene.

The monovinyl-substituted aromatic hydrocarbons which can be used in the preparation of the novel copolymer have 8–12 carbon atoms per molecule. Examples are styrene, 3-methylstyrene, 4-n-propylstyrene, 4-t-butylstyrene and the like. Especially preferred is styrene.

The novel teleblock copolymers will generally contain conjugated diene and monovinyl-substituted aromatic hydrocarbon in amounts within the range of about 90:10 to about 60:40 parts by weight of conjugated diene:monovinyl-substituted aromatic hydrocarbon. About 85:15 to about 70:30 parts by weight of conjugated diene:monovinyl-substituted aromatic hydrocarbon is the especially preferred range for best adhesive properties.

Any organomonolithium initiator known in the art can be used to initiate polymerization of the conjugated diene and monovinyl-substituted aromatic hydrocarbon to produce the teleblock copolymers in this invention. Those hydrocarbyllithium compounds containing from 1 to about 20 carbon atoms are generally useful. Examples of such initiators include methyllithium, n-propyllithium, isopropyllithium, n-butyllithium, sec-butyllithium, tert-butyllithium, n-decyllithium, n-eicosyllithium, phenyllithium, p-tolyllithium, cyclohexyllithium and the like. The n-alkyllithium compounds give polymers which result in adhesives with especially good creep resistance, and n-butyllithium is the especially preferred initiator.

The amount of initiator used will be varied, depending upon the desired molecular weight of the resultant copolymer. The teleblock copolymers of this invention can vary from relatively low molecular weight rubbers up to those having a molecular weight of 500,000 or more. The initiator levels useful in preparing the inventive copolymers for the inventive adhesives are generally in the range of about 0.25 to about 40 gram millimoles per 100 grams of total monomers.

In this invention, a polar compound (such as acyclic or cyclic ethers or tertiary amines) is preferably employed in the polymerization of the conjugated diene and monovinyl-substituted aromatic hydrocarbon in order to increase the rate of polymerization. The reaction will proceed without the polar compound not only at a very slow rate. If a sec- or tert-alkyllithium initiator were used, the reaction rate would be faster; but a polar compound would still be preferred. Diethyl ether, tetrahydrofuran and tetramethylethylenediamine are among those frequently used in amounts ranging from about 0.01 to about 100 and usually from about 0.2 to about 10 gram millimoles per 100 grams of monomer.

Use of a hydrocarbon diluent is much to be preferred in the polymerization process for ease in mixing and for temperature control. Common diluents which are well known in the art to be useful in solution polymerization processes include n-hexane, n-heptane, cyclohexane, benzene, toluene, and the like and mixtures thereof. A reasonable range of amount of diluent that can be used is about 50-2000 parts by weight per 100 parts by weight of monomer.

The polymerization process of this invention involves the incremental addition of both organomonolithium initiator and monovinyl-substituted aromatic hydrocarbon. In other words, a portion of the total monovinyl-substituted aromatic hydrocarbon monomer and a portion of the organolithium initiator are mixed with the diluent in the reactor. After the initial monovinyl-substituted aromatic hydrocarbon charge polymerizes to the desired degree, the remainder of monovinyl-substituted aromatic hydrocarbon and initiator is added to the reactor in at least one more increment and in as many increments as desired. This incremental addition of both initiator and first monomer provides much greater control over the reaction than could be obtained by incremental addition of only the initiator.

It is generally desirable to employ from about 10 to about 90 percent of the monovinyl-substituted aromatic hydrocarbon, preferably about 25 to about 75 percent, and from about 10 to about 60 percent of the initiator, preferably about 20 to about 45 percent, in the initial polymerization step. It is preferable to then employ the remainder of the monovinyl-substituted aromatic hydrocarbon and initiator in the second polymerization step. After this polymerization, conjugated diene is introduced into the unquenched polymerization system and is allowed to polymerize.

The polymerization process is generally carried out at temperatures in the range of about $-25°$ to about $150°$ C., preferably about $25°$ to about $125°$ C. It is especially convenient to employ a process in which essentially adiabatic conditions are maintained; i.e., the heat liberated by the polymerization reaction is not removed by use of internal or external cooling devices, but the temperature of the polymerization system is allowed to rise until the polymerization reaction is essentially complete and the temperature of the system then decreases.

If desired, the reaction system can be maintained under positive pressure, which pressure can be applied either by the addition of an inert gas, such as nitrogen, or by only the vapor pressures of the components of the reaction system. Convenient pressures can be in the range of about 50 to about 10,000 kPa and preferably and more conveniently in the range of about 50 to about 800 kPa.

Polymerization times will generally be determined by the temperature, as well as by the reactivities of the components. Normal polymerization times will generally be in the range of about 0.1 min to about 24 hours and preferably about 1 minute to about one hour.

At the conclusion of the polymerization reaction, a polyfunctional coupling agent (containing at least two reactive sites) is added to the unquenched reaction mixture to produce the coupled copolymer. This agent must be added before any material such as water, acid or alcohol is added. The temperature of the coupling reaction can vary over a wide range and is conveniently the same as that used for polymerization. At normal polymerization temperatures, i.e., above about $25°$ C., the coupling reaction occurs rapidly, i.e., in the range of several seconds to about 1 hour.

The polyfunctional coupling agents which are added to the polymerization mixture after completion of the polymerization reaction include those polyepoxides, polyisocyanates, polyimines, polyaldehydes, polyketones, polyanhydrides, polyesters, polyhalides and the like which are described fully in U.S. Pat. No. 3,281,383. The polyhalides, especially the silicon tetrahalides, such as silicon tetrachloride, are the preferred coupling agents.

In order to achieve maximum coupling, the optimum amount of polyfunctional coupling agent to be employed will be that amount of coupling agent which contains one gram-equivalent of coupling agent for each gram-equivalent of lithium-terminated polymer molecules. In other words, each reactive functional site in the coupling agent will react with one carbon-lithium bond in the living polymer. Any given agent may demonstrate an effective functionality which is less than theoretical, but it is the actual reacting sites which are considered in determining functionality. When equivalent amounts of the polyfunctional coupling agent and the living polymer are contacted, the resulting final product is either a linear polymer when using a difunctional agent or a radial polymer (in which three or more polymer chains extend radially from the centralized coupling agent residue) when using an agent having 3 or more functional groups. It may sometimes be desirable to employ a slight excess of coupling agent such as up to 25 mole percent in excess of the stoichiometric amount of coupling agent.

A currently convenient process for preparing the teleblock copolymers of the invention is as follows. Care must be taken to exclude moisture or oxygen from the polymerization system. A portion of the monovinyl-substituted aromatic hydrocarbon and the diluent in a suitable reactor are maintained at the desired temperature for initiation of polymerization. Introduction of a portion of the organomonolithium compound initiates the polymerization of the monovinyl-substituted aromatic hydrocarbon monomer. At least one more portion of both the monovinyl-substituted aromatic hydrocarbon and initiator are added to the reaction vessel, and polymerization is allowed to proceed. After completion of the monovinyl-substituted aromatic hydrocarbon polymerization, conjugated diene monomer is introduced into the unquenched polymerization system. After completion of the polymerization of conjugated diene monomer, the bifunctional or polyfunctional coupling agent is added. When the coupling reaction is complete, if any carbon-lithium remains it can be inactivated by addition of water, alcohol or acid. The resultant teleblock copolymer is then isolated by any suitable means well known in the art, such as coagulation by alochol or steam-stripping of volatiles, followed by appropriate drying procedures.

It is believed that the incremental addition of both the initiator and of the monovinyl-substituted aromatic hydrocarbon broadens the molecular weight distribution (and thus raises the heterogeneity index) of the monovinyl-substituted aromatic hydrocarbon portions of the produced copolymers without producing an appreciable corresponding increase in the heterogeneity index of the total polymer. This broadening in the size variation of the monovinyl-substituted aromatic block in the rubbery copolymers is believed to contribute to the enhanced adhesive properties observed in adhesive formulations prepared from such copolymers. The range of heterogeneity index of the monovinyl-substituted aromatic hydrocarbon portion of the copolymer which would be within the scope of the invention is about 1.4 to about 3.0; and the preferred range is about 1.4 to about 2.0. The heterogeneity index of the total copolymer in this invention will generally lie within the range of about 1.1 to about 1.4; and this range is defined to be "regular". The heterogeneity index of the monovinyl-substituted aromatic hydrocarbon portion of the copolymer is substantially larger than the heterogeneity index of the total copolymer, substantially larger being defined in this invention as at least about 0.1 units larger.

For control of the reaction, it is desirable to allow the reaction mixture of the first increment of monovinyl-substituted aromatic compound, polar compound, and hydrocarbon diluent (if present) to reach the optimal polymerization temperature before the first increment of initiator is added. Also, for control of the reaction, it is desirable that the second and other remaining increments of initiator be put into the reactor either prior to or simultaneous with the second or other remaining increments of monovinyl-substituted aromatic hydrocarbon.

The inventive adhesive formulations of this invention include, in addition to the teleblock copolymers, a tackifier or tackifiers. Plasticizers, stabilizers, and diluent may be included, if desired.

Suitable tackifiers include any of the resinous substances known in the art for enhancing tack of adhesive compositions. Examples of useful tackifiers include rosin, rosin derivatives, polyterpene resins, phenolic resins, coumarone-indene resins and the like.

Any of the plasticizers well known in the adhesives art can be employed in the inventive formulations. Such plasticizers include the well known extender oils, aromatic, paraffinic or naphthenic, as well as a wide variety of liquid polymers.

Stabilizers are generally employed in the inventive adhesive formulations to inhibit degradation of the adhesive by exposure to heat, light, oxygen, ozone, etc. Examples of common stabilizers which are useful in the inventive formulations include the well-known hindered phenols, phosphites, phenolic phosphites, thiodicarboxylate esters and the like, as well as mixtures thereof.

The adhesives of this invention can be applied to substrates as solutions, emulsions, dispersions or hot-melts. When applied as solutions, the formulations can contain hydrocarbon solvents such as n-hexane, cyclohexane, benzene, toluene, etc. When applied as emulsions or dispersions, suitable carriers such as water and suitable emulsifiers are present in the formulations.

It is also within the scope of this invention to include various other components in the adhesive formulations. For example, it may be desirable to add such materials as pigments, wetting agents, curatives, reinforcing agents, and fillers to the formulation.

The adhesive formulations will preferably contain the various ingredients in amounts given in the following recipe.

Recipe

|  | Parts by Weight (Approximate Values) |
|---|---|
| Teleblock copolymer | 100 |
| Tackifier | 40 to 150 |
| Plasticizer | 0 to 100 |
| Stabilizer | 0.1 to 5 |
| Solvent, when employed | 75 to 2000 |
| Water, when employed | 5 to 250 |

The following examples are provided, illustrating the best known way of practicing the invention. However, the invention is not to be construed as limited thereto.

EXAMPLE I (Control)

Into a stirred 76 liter reactor were placed cyclohexane (38.7 kg), tetrahydrofuran (0.068 kg) and styrene (1.36 kg). After the reaction mixture was heated to 66° C. (205 kPa pressure), n-butyllithium (0.96 kg of 1.2 weight percent n-butyllithium in cyclohexane) was added. After 12 minutes (temperature 68° C., pressure 240 kPa) butadiene (5.45 kg) was added. Three minutes after butadiene addition (temperature 73° C., pressure 480 kPa), silicon tetrachloride (0.77 kg of 1 weight percent $SiCl_4$ in cyclohexane) was added. After the reaction mixture was cooled to approximately ambient temperature 2,6-di-t-butyl-4-methylphenol (0.05 kg) and tris(nonylphenyl)phosphite (0.1 kg) were added to the reaction mixture which was then steam stripped to remove volatiles, and the recovered polymer was dried in a Welding Engineers twin screw extruder at a maximum temperature of 150° to 180° C., The properties of the resultant polymer are recorded in Table II (Run 1).

EXAMPLE II (Invention)

Runs 2 and 3 were carried out according to this invention to prepare 80/20 butadiene/styrene radial teleblock copolymers employing incremental addition of both styrene and n-butyllithium.

The following recipe and Table I give the ingredients and amounts thereof and polymerization conditions. Table II gives the properties of the resultant polymers.

Into a stirred 76 liter reactor were placed cyclohexane, tetrahydrofuran and the first increment of styrene. Upon heating the solution to 66° C. the first increment of n-butyllithium was added. Following completion of polymerization of the first increment of styrene the second increments of n-butyllithium and styrene were added to the reaction mixture. Following completion of styrene polymerization, butadiene was added; and after polymerization of the butadiene, silicon tetrachloride was added. After the reaction mixture cooled to approximately ambient temperature, the stabilizers were added; and the reaction mixture was steam stripped to remove volatiles. The resultant polymer was dried in a Welding Engineers twin screw extruder at a maximum temperature of 150° to 180° C.

| Run | Recipe | |
|---|---|---|
|  | 2 | 3 |
| Cyclohexane, kg | 38.7 | 38.9 |
| Styrene, 1st increment, kg | 0.68 | 0.68 |
| Styrene, 2nd increment, kg | 0.68 | 0.68 |
| Butadiene, kg | 5.45 | 5.45 |

-continued

| Run | Recipe | |
|---|---|---|
| | 2 | 3 |
| Tetrahydrofuran, kg | 0.068 | 0.068 |
| n-Butyllithium, 1st increment, kg[1] | 0.39 | 0.28 |
| n-Butyllithium, 2nd increment, kg[1] | 0.58 | 0.80 |
| Silicon tetrachloride, kg[2] | 0.77 | 0.86 |
| 2,6-Di-t-butyl-4-methylphenol, kg | 0.05 | 0.05 |
| Tris(nonylphenyl)phosphite, kg | 0.10 | 0.10 |

[1]Weight of 1.2 weight percent solution in cyclohexane.
[2]Weight of 1 weight percent solution in cyclohexane.

Table I

| Run No. | 2 | 3 |
|---|---|---|
| Initial temp. at NBL addn., °C. | 67 | 66 |
| Initial pressure at NBL addn., kPa | 171 | 171 |
| Temp at 2nd increment addn., °C. | 68 | 66 |
| Pressure at 2nd increment addn., kPa | 178 | 247 |
| Time from NBL addn. to 2nd increment addn., min. | 14 | 20 |
| Temp at butadiene addn., °C. | 71 | 64 |
| Pressure at butadiene addn., kPa | 171 | 415 |
| Time from 2nd increment addn. to butadiene addn., min. | 16 | 20 |
| Temp at SiCl$_4$ addn., °C. | 81 | 93 |
| Pressure at SiCl$_4$ addn., kPa | 359 | 452 |
| Time from butadiene addn. to SiCl$_4$ addn., min. | 5 | 12 |

Table II

| Run No. | 1 (Control) | 2 (Invention) | 3 (Invention) |
|---|---|---|---|
| Melt Index[1] | 0.7 | 0.1 | 0.4 |
| Inherent viscosity[2] | 1.06 | 1.27 | 1.05 |
| Trans unsaturation, %[3] | 38.6 | 39.9 | 40.6 |
| Vinyl unsaturation, %[3] | 8.5 | 8.5 | 8.7 |
| Styrene, %[4] | 21.2 | 19.2 | 19.0 |
| Polystyrene, %[5] | 18.9 | 15.4 | 14.0 |
| $M_w \times 10^{-3}/M_n \times 10^{-3}$[6] | 154/122 | 158/123 | 152/113 |
| HI[7] | 1.26 | 1.28 | 1.34 |
| Polystyrene portion[8] | | | |
| $M_w \times 10^{-3}/M_n \times 10^{-3}$ | 8.9/7.6 | 12.1/7.5 | 14.6/7.7 |
| HI | 1.17 | 1.61 | 1.90 |

[1]ASTM D-1238-65T. 180° C., 5 kg.
[2]Measured according to U.S. Pat. No. 3,278,508, col. 20, note (a) using tetrahydrofuran as solvent.
[3]By infrared analysis based on total polymer.
[4]By ultraviolet analysis.
[5]According to I. M. Kolthoff, et al, J. Polymer Sci 1, 429 (1946).
[6]Determined using a calibrated gel permeation chromatograph. ($M_w$ is the weight average molecular weight and $M_n$ is the number average molecular weight.)
[7]Ratio of $M_w/M_n$.
[8]Polystyrene portion recovered from polymerization reactor prior to butadiene addition and analyzed by gel permeation chromatography (footnotes 6 & 7).

The results in Table II clearly show that the molecular weight distribution of the polystyrene portion of the copolymer is broadened and that the overall heterogeneity index of the copolymer is not appreciably correspondingly increased.

EXAMPLE III

The polymers made in Runs 1, 2 and 3 were employed in hot melt pressure sensitive adhesives. The adhesives were formulated according to the following recipe. Evaluations of the adhesives are recorded in Table III and are labeled Runs 4, 5 and 6.

| Recipe | Parts By Weight |
|---|---|
| Radial teleblock copolymer | 100 |
| Modified rosin ester[1] | 100 |
| Coumarone-indene resin[2] | 40 |
| Naphthenic oil[3] | 60 |
| Dilauryl thiodipropionate | 1 |
| Antioxidant[4] | 4 |

[1]Foral 85 from Hercules, Inc.
[2]Cumar LX-509 from Neville Chem. Co.
[3]Shellflex 371 from Shell.
[4]Agerite Geltrol from R. T. Vanderbilt Co.

Table III

| Run No. | 4 (Control) | 5 | 6 |
|---|---|---|---|
| Polymer Run No. | 1 | 2 | 3 |
| Melt viscosity, cps, 177° C.[1] | | | |
| Initial | 29,400 | 42,400 | 31,000 |
| Aged 24 hr | 26,600 | 30,000 | 17,600 |
| Holding power, hr[2] | 0.8 | 9.5 | >24 |
| Quick stick, opiw[3] | 16.48 | 14.8 | 20 |
| 180° peel strength, ppiw[4] | 2.3 | 2.5 | 3.1 |

[1]Measured in centipoises at 177° C. using Brookfield Thermosel Viscometer and Spindel No. 4-27. Aged sample was maintained at 177° C. for 24 hours.
[2]Measured as time in hours at 60° C. or 1.6 mm slippage when 6.5 cm$^2$ of adhesive on Mylar film backing is bonded to stainless steel and loaded in shear with a 100 gm weight.
[3]Measured in ounces per inch of width. Pressure Sensitive Tape Council - Method 5.
[4]Measured in pounds per inch of width. Pressure Sensitive Tape Council - Method 1.

The data in Table III demonstrate the advantage of inventive adhesive formulations 5 and 6 over prior art adhesive formulation 4 in creep resistance (holding power). The quick stick and peel strength values are likewise generally higher for the inventive adhesives.

While this invention has been described in detail for purposes of illustration, it is not to be construed as limited thereby. Rather, it is intended to cover reasonable changes and modifications which would be apparent to one skilled in the art.

I claim:

1. An adhesive composition comprising about 100 parts by weight of a rubbery teleblock copolymer, about 40 to 150 parts by weight of tackifier, about 0 to 100 parts by weight of plasticizer, and about 0.1 to 5 parts by weight of stabilizer, wherein said rubbery teleblock copolymer is prepared by:
   (a) polymerizing an initial portion of monovinyl-substituted aromatic hydrocarbon in the presence of an initial portion of an organomonolithium polymerization initiator to form an initial living polymer mixture,
   (b) adding sequentially to said initial living polymer mixture at least one further portion of monovinyl-substituted aromatic hydrocarbon and at least one further portion of organomonolithium initiator and letting each further portion of monovinyl-substituted aromatic hydrocarbon polymerize such as to form a further living polymer mixture,
   (c) adding conjugated diene to said further living polymer mixture and letting said conjugated diene polymerize such as to form a living polymer, and
   (d) coupling said living polymer to form said rubbery teleblock copolymer.

2. An adhesive composition according to claim 1 wherein said conjugated diene is butadiene and wherein said monovinyl-substituted aromatic hydrocarbon is styrene.

3. An adhesive composition according to claim 2 wherein the total number of portions of styrene is 2 and the total number of portions of initiator is 2.

4. An adhesive composition according to claim 3 wherein about 10 to about 90 percent of the total styrene in the rubbery teleblock copolymer is said initial portion of styrene and about 10 to about 90 percent of the total initiator used to form said rubbery teleblock copolymer is said initial portion of initiator.

5. An adhesive composition according to claim 3 wherein about 25 to about 75 percent of the total styrene in the rubbery teleblock copolymer is said initial portion of styrene and about 20 to about 45 percent of the total initiator used to form said rubbery teleblock copolymer is said initial portion of initiator.

6. An adhesive composition according to claim 1 wherein polymerization takes place in the presence of a hydrocarbon diluent.

7. An adhesive composition according to claim 6 wherein a small amount of a polar compound is initially added to said hydrocarbon diluent.

8. An adhesive composition according to claim 7 wherein said polar compound is tetrahydrofuran.

9. An adhesive composition according to claim 8 wherein said organomonolithium initiator is N-butyllithium.

10. An adhesive composition according to claim 1 wherein a coupling agent having 3 or more reactive sites is used in step (d).

11. An adhesive composition according to claim 2 wherein the weight ratio of butadiene:total styrene is about 80:20.

12. An adhesive composition comprising about 100 parts by weight of a rubbery teleblock copolymer, about 40 to 150 parts by weight of tackifier, about 0 to 100 parts by weight of plasticizer, and about 0.1 to 5 parts by weight of stabilizer, wherein said rubbery teleblock copolymer is represented by the general formula $$(S-D)_xY$$

wherein S represents a block of polymerized monovinyl-substituted aromatic hydrocarbon molecules, D represents a block of polymerized conjugated diene molecules, Y represents the residue of a polyfunctional coupling agent, x is an integer of at least 2, and wherein the heterogeneity index of the monovinyl-substituted aromatic hydrocarbon portion S of the copolymer is substantially larger than the heterogeneity index of the total copolymer.

13. An adhesive composition according to claim 12 wherein the heterogeneity index of the monovinyl-substituted aromatic hydrocarbon portion S of the copolymer is in the range from about 1.4 to about 2.0, whereas the heterogeneity index of the total copolymer is regular.

14. An adhesive composition according to claim 13 wherein S is a styrene block and D is a butadiene block.

15. An article of manufacture to which the adhesive according to claim 1 is adhering.

16. An article of manufacture to which the adhesive according to claim 12 is adhering.

17. An adhesive composition according to claim 1 wherein the weight ratio of conjugated diene:monovinyl-substituted aromatic hydrocarbon is in the range from about 90:10 to about 60:40.

18. An adhesive composition according to claim 12 wherein the weight ratio of conjugated diene:monovinyl-substituted aromatic hydrocarbon is in the range from about 90:10 to about 60:40.

* * * * *

UNITED STATES PATENT AND TRADEMARK OFFICE
CERTIFICATE OF CORRECTION

PATENT NO. : 4,148,771

DATED : April 10, 1979

INVENTOR(S) : Larry L. Nash

It is certified that error appears in the above–identified patent and that said Letters Patent are hereby corrected as shown below:

Column 9, line 4, "90" should read ---60---; line 23, "N" should read --- n ---; line 25, "1" should read --- 14 ---.

Signed and Sealed this

Twenty-first Day of August 1979

[SEAL]

Attest:

LUTRELLE F. PARKER

Attesting Officer — Acting Commissioner of Patents and Trademarks